US010936795B2

(12) United States Patent
Decker et al.

(10) Patent No.: US 10,936,795 B2
(45) Date of Patent: *Mar. 2, 2021

(54) TECHNIQUES FOR USE OF SNAPSHOTS WITH BROWSING TRANSITIONS

(71) Applicant: Apple Inc., Cupertino, CA (US)

(72) Inventors: Kevin W. Decker, San Jose, CA (US);
Darin B. Adler, Los Gatos, CA (US);
Beth M. Dakin, San Jose, CA (US);
Brady K. Eidson, Sunnyvale, CA (US);
Craig M. Federighi, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 1049 days.

This patent is subject to a terminal disclaimer.

(21) Appl. No.: 14/104,604

(22) Filed: Dec. 12, 2013

(65) Prior Publication Data

US 2014/0123000 A1 May 1, 2014

Related U.S. Application Data

(63) Continuation of application No. 13/224,903, filed on Sep. 2, 2011, now Pat. No. 8,661,337.

(60) Provisional application No. 61/493,485, filed on Jun. 5, 2011.

(51) Int. Cl.
*G06F 17/00* (2019.01)
*G06F 40/14* (2020.01)
*G06F 16/957* (2019.01)

(52) U.S. Cl.
CPC .......... *G06F 40/14* (2020.01); *G06F 16/9574* (2019.01)

(58) Field of Classification Search
CPC ............... G06F 17/30864; G06F 40/14; G06F 16/9574; G06Q 10/10
USPC ................................... 715/234, 200
See application file for complete search history.

(56) References Cited

U.S. PATENT DOCUMENTS

| | | | |
|---|---|---|---|
| 6,313,855 B1 | 11/2001 | Shuping et al. | |
| 6,356,908 B1 | 3/2002 | Brown et al. | |
| 6,744,452 B1 * | 6/2004 | McBrearty | G06F 17/30902 707/E17.12 |
| 6,799,251 B1 * | 9/2004 | Jacobs | G06F 16/9574 711/133 |
| 7,069,497 B1 * | 6/2006 | Desai | G06F 16/958 715/205 |
| 7,814,425 B1 | 10/2010 | O'Shaugnessy et al. | |
| 7,949,729 B2 * | 5/2011 | Nickerson | H04L 67/02 709/219 |
| 8,069,410 B2 * | 11/2011 | Sylthe | G06F 17/217 715/234 |

(Continued)

OTHER PUBLICATIONS

How-To Geek, How to Refresh the Thumbnails on Google Chrome's New Tab Page, published Mar. 19, 2011, How-To Geek, pp. 1-3.*

(Continued)

*Primary Examiner* — Manglesh M Patel
(74) *Attorney, Agent, or Firm* — Womble Bond Dickinson (US) LLP

(57) ABSTRACT

A snapshot of a page is stored in response to navigation away from the page. When the user navigates back to the page, the snapshot is displayed while the page is loaded. When the page is sufficiently loaded, the snapshot is replaced by the (fully or partially) loaded page. Determining whether the page is sufficiently loaded is based on monitoring of pre-selected criteria.

40 Claims, 4 Drawing Sheets

(56) References Cited

U.S. PATENT DOCUMENTS

| | | | |
|---|---|---|---|
| 8,196,035 B2 | 6/2012 | Sadan et al. | |
| 8,205,172 B2 | 6/2012 | Wong et al. | |
| 8,281,259 B2 | 10/2012 | Millic-Frayling et al. | |
| 8,286,078 B2 | 10/2012 | Yi | |
| 8,386,955 B1 | 2/2013 | Weber et al. | |
| 8,826,141 B2 * | 9/2014 | Dimitrov | G06F 16/957 715/738 |
| 9,065,793 B2 * | 6/2015 | Gleadall | G06F 16/9574 |
| 10,347,043 B2 * | 7/2019 | Ciechanowski | G06T 13/20 |
| 2002/0163545 A1 | 11/2002 | Hii | |
| 2003/0182357 A1 * | 9/2003 | Chess | G06F 16/9574 709/203 |
| 2004/0205514 A1 | 10/2004 | Sommerer et al. | |
| 2006/0059440 A1 | 3/2006 | Pry | |
| 2008/0229427 A1 | 9/2008 | Ramirez | |
| 2008/0235594 A1 | 9/2008 | Bhumkar et al. | |
| 2008/0294974 A1 | 11/2008 | Nurmi et al. | |
| 2009/0100356 A1 | 4/2009 | Kujda | |
| 2011/0087991 A1 * | 4/2011 | Levison | H04L 12/24 715/780 |
| 2011/0093790 A1 * | 4/2011 | Maczuba | G06F 17/30902 715/745 |
| 2011/0113346 A1 | 5/2011 | O'Shaugnessy et al. | |
| 2014/0136951 A1 * | 5/2014 | Kumar | G06F 16/9574 715/234 |
| 2014/0143649 A1 * | 5/2014 | Bridgen | G06F 16/9574 715/234 |

OTHER PUBLICATIONS

Lars R. Clausen, Concerning Etags and Datestamps, Published 2004 via International Web Archiving Workshop, pp. 1-13 (pdf).*

James Mickens, Silo: Exploiting JavaScript and DOM Storage for Faster Page Loads, published Jun. 2010 via USENIX & Microsoft, pp. 1-12 (pdf).*

Amir Boroumand, A Web Developers Guide to Browser Caching, published Jul. 25, 2017 by medium.com, pp. 1-11 (pdf).*

Fitzpatrick Jason, Reload Tabs by Double Clicking Them, Mar. 23, 2009, p. 1.

* cited by examiner

TECHNIQUES FOR USE OF SNAPSHOTS WITH BROWSING TRANSITIONS

This U.S. patent application is a continuation of co-pending U.S. application Ser. No. 13/224,903, filed on Sep. 2, 2011, which claims priority to U.S. Provisional Patent Application No. 61/493,485, entitled, "Techniques For Use of Snapshots With Browsing Transitions" filed Jun. 5, 2011.

TECHNICAL FIELD

Embodiments of the invention relate to graphical representations of pages of data, for example, in a browser application. More particularly, embodiments of the invention relate to use of snapshot images to facilitate transitions between pages.

BACKGROUND

Browser applications are commonly used to access pages of information over a network. When transitioning between pages, browsers present a new page in response to certain conditions, for example, when a first non-empty layout is generated or when all object in the page have been loaded. These conditions may result in slow loading or in a user experiencing a partially-loaded page.

SUMMARY

A snapshot of a page is stored in response to navigation away from the page. The navigation away from the page may be in response to user input that may be, for example, a swipe gesture, clicking of a button, tapping a control pad, selecting a link, or any other navigation technique. When the user navigates back to the page, the snapshot is displayed while the page is loaded. The navigation back to the page may be in response to user input that may be, for example, a swipe gesture, clicking of a button, tapping a control pad, selecting a link, or any other navigation technique. When the page is sufficiently loaded, the snapshot is replaced by the (fully or partially) loaded page. In one embodiment, determining whether the page is sufficiently loaded is based on monitoring of pre-selected criteria. The pre-selected criteria can be one or more of: page complexity, page loading status, render tree size, DOM tree characteristics, outstanding network requests, and/or user input.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

When a user of an electronic device (e.g., computer system, tablet device, smartphone, kiosk) utilizes a browser to access information presented as a page the user is provided the best experience when pages switch quickly and completely. As discussed above, under certain conditions a user may be provided with a less than optimal experience. Described herein are techniques to improve the user experience when switching between pages using a browser or other application to view content presented as pages.

In one embodiment, when a user navigates away from a page, a snapshot of that page is stored and may be used if a user navigates back to the page. When the user navigates back to a previously viewed page, the browser may present the stored snapshot of the page until the page can be loaded sufficiently to provide the user with a satisfactory experience.

Various characteristics may be monitored to determine when to provide the page instead of the previously captured snapshot. For example, the complexity of the remaining content to be rendered may be monitored, the size of a DOM tree or render tree may be evaluated, a number of outstanding network requests may be monitored. Other characteristics and parameters may also be monitored.

Figure 1:
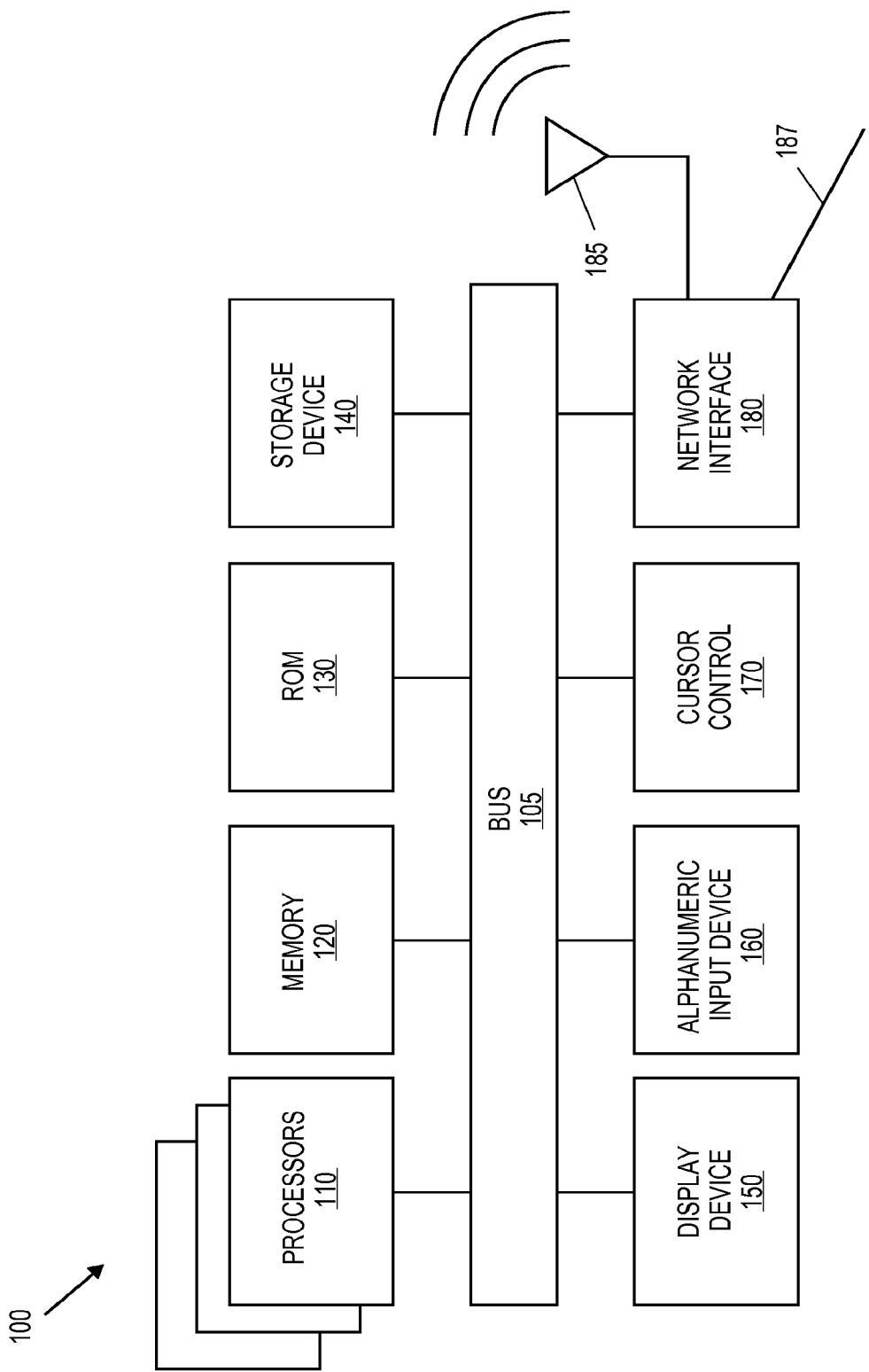
FIG. 1 is a block diagram of one embodiment of an electronic system.

FIG. 1 is a block diagram of one embodiment of an electronic system. The electronic system illustrated in FIG. 1 is intended to represent a range of electronic systems (either wired or wireless) including, for example, desktop computer systems, laptop computer systems, tablet devices, cellular telephones, personal digital assistants (PDAs) including cellular-enabled PDAs, set top boxes. Alternative electronic systems may include more, fewer and/or different components.

Electronic system 100 includes bus 105 or other communication device to communicate information, and processor 110 coupled to bus 105 that may process information. While electronic system 100 is illustrated with a single processor, electronic system 100 may include multiple processors and/or co-processors. Electronic system 100 further may include random access memory (RAM) or other dynamic storage device 120 (referred to as main memory), coupled to bus 105 and may store information and instructions that may be executed by processor 110. Main memory 120 may also be used to store temporary variables or other intermediate information during execution of instructions by processor 110.

Electronic system 100 may also include read only memory (ROM) and/or other static storage device 130 coupled to bus 105 that may store static information and instructions for processor 110. Data storage device 140 may be coupled to bus 105 to store information and instructions. Data storage device 140 such as a magnetic disk or optical disc and corresponding drive may be coupled to electronic system 100.

Instructions are provided to memory from a storage device, such as magnetic disk, a read-only memory (ROM) integrated circuit, CD-ROM, DVD, via a remote connection (e.g., over a network via network interface 130) that is either wired or wireless providing access to one or more electronically-accessible media, etc. In alternative embodiments, hard-wired circuitry can be used in place of or in combination with software instructions. Thus, execution of sequences of instructions is not limited to any specific combination of hardware circuitry and software instructions.

A computer-readable medium includes any mechanism that provides content (e.g., computer executable instructions) in a form readable by an electronic device (e.g., a computer, a personal digital assistant, a cellular telephone). For example, a computer-readable medium may include read only memory (ROM); random access memory (RAM); magnetic disk storage media; optical storage media; flash memory devices; etc.

Electronic system 100 may also be coupled via bus 105 to display device 150, such as a cathode ray tube (CRT) or liquid crystal display (LCD), to display information to a user. Alphanumeric input device 160, including alphanumeric and other keys, may be coupled to bus 105 to communicate information and command selections to processor 110. Another type of user input device is cursor control 170, such as a mouse, a trackball, or cursor direction keys to communicate direction information and command selections to processor 110 and to control cursor movement on display 150.

Electronic system 100 further may include network interface(s) 180 to provide access to a network, such as a local area network. Network interface(s) 180 may include, for example, a wireless network interface having antenna 185, which may represent one or more antenna(e). Network interface(s) 180 may also include, for example, a wired network interface to communicate with remote devices via network cable 187, which may be, for example, an Ethernet cable, a coaxial cable, a fiber optic cable, a serial cable, or a parallel cable.

In one embodiment, network interface(s) 180 may provide access to a local area network, for example, by conforming to IEEE 802.11b and/or IEEE 802.11g standards, and/or the wireless network interface may provide access to a personal area network, for example, by conforming to Bluetooth standards. Other wireless network interfaces and/or protocols can also be supported.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Bluetooth protocols are described in "Specification of the Bluetooth System: Core, Version 1.1," published Feb. 22, 2001 by the Bluetooth Special Interest Group, Inc. Associated as well as previous or subsequent versions of the Bluetooth standard may also be supported.

In addition to, or instead of, communication via wireless LAN standards, network interface(s) 180 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

The navigation transitions described herein may be provided in response to any type of user input that may be provided to navigate between pages. One common navigation technique is the use of forward and back buttons on a browser application. Another common navigation technique is use of links on a graphical user interface or keyboard buttons on a computer keyboard.

In one embodiment, navigation may be in response to gesture inputs by a user. These gestures may include, for example, a swiping motion on an input pad, or a movement in a particular direction. Further, navigation may be accomplished by non-tactile inputs, for example, a computing device may monitor user motions and provide corresponding navigation. Other input techniques may also be utilized with the transition mechanisms described herein.

Described below are various techniques for providing transitions between pages viewed in a browser.

Figure 2:
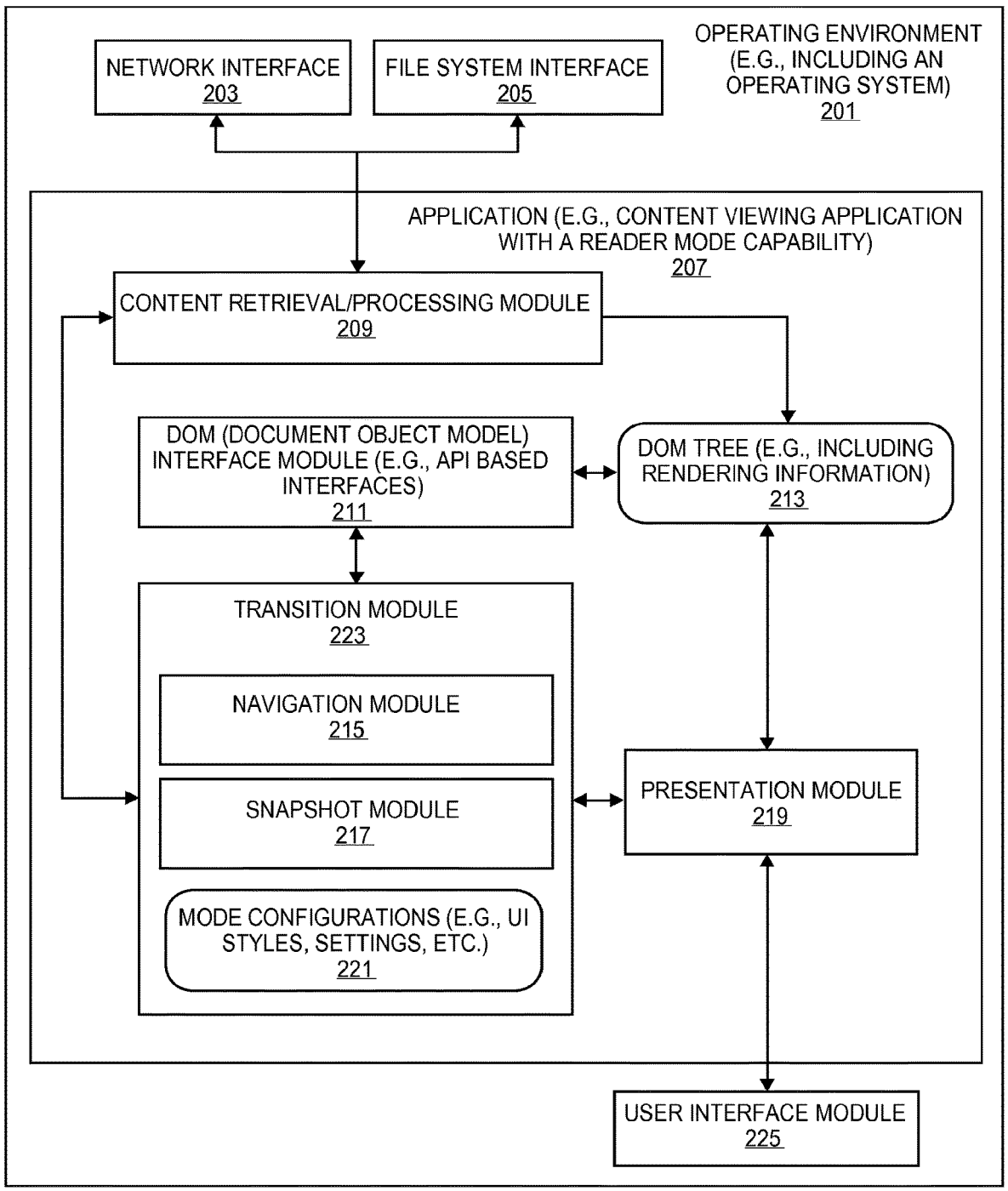
FIG. 2 is a block diagram of a system to present pages of data.

FIG. 2 is a block diagram illustrating one embodiment of a system 200, such as in a data processing system or a computer, for presenting web content in a browser. System 201 can be a computer operating environment including an operating system and/or an application 207, such as a content viewing application to present the web content. Application 207 may be a browser capable of navigating to and from pages and to provide transitions as described herein.

Content retrieval/processing module 209 may retrieve a document or content from a network via a network interface 203 (e.g. from a remote web server) or a file system locally or remotely coupled via file system interface 205. In one embodiment, the content received may be a hypertext based document encoded in languages such as HTML (Hyper Text Markup Language), XML (Extensible Markup Language), or other markup languages, etc.

Content retrieval/processing module 209 can process (e.g. parse) a document to identify document elements and generate or build a DOM tree or DOM structure 213 out of the document elements. A document element may be a hypertext element such as an HTML tag in an HTML document. In one embodiment, DOM tree 213 may represent a topological or structural relationship among the document elements. Each node in DOM tree 213 of a document may correspond to one document element of the document. Document elements may include document content and/or layout specifications, such as size attributes associated with HTML tags in an HTML document, for presenting the document content, e.g. via presentation module 219 to display a user interface rendering a web page on a display screen via user interface module 225.

In one embodiment, content retrieval/processing module 209 may include a rendering engine to generate rendering information, such as layout parameters (e.g. sizing data of a rectangular area) for each node in DOM tree 213 for presenting a corresponding document. The rendering engine can make rendering decisions according to configurations including layout specifications in a document, user interface settings for application 207 and/or other system settings, etc. A rendered DOM tree may represent web content such as a web page presented by a browser.

In one embodiment, application 207 may include transition module 223 that interacts with DOM interface module 211 to perform transitions between pages as described herein. Transition module 223 may include navigation module 215 to detect navigation events. Snapshot module 217 may generate and/or manage snapshots that may be utilized as described herein. Mode configuration module 221 may allow a user to set parameters related to transitions, for example, a cache size to be used, a transition sensitivity, etc.

Figure 3:
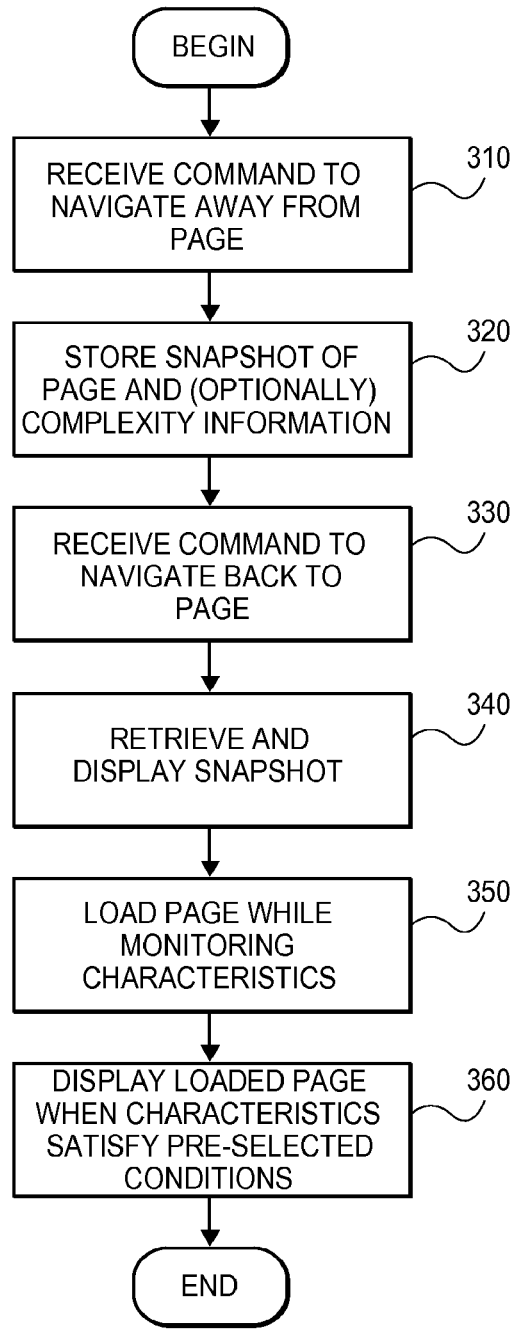
FIG. 3 is a flow diagram of one embodiment of a technique to provide transitions between pages when browsing.

FIG. 3 is a flow diagram of one embodiment of a technique to provide transitions between pages when browsing. In one embodiment, the pages are provided by a browser application and navigation is in response to user input. The user input may be provided by use of buttons or other graphical components, or by user gestures provided through an input pad or touch screen, or any combination thereof. Other input mechanisms can also be supported.

As a user accesses a page, the user may interact with the page in any manner known in the art. At some point, the user may choose to navigate away from the page. The user then provides a command to navigate away from the page, 310. Any of the various navigational techniques described herein may be utilized to navigate away from the page.

In response to the command to navigate away from the page, the browser (or other system component) causes a snapshot image of the page to be stored, 320. The snapshot is an image of the contents provided by the browser. The snapshot may be stored, for example, as a bitmap image or other type of image. The snapshot may be stored in a cache or other memory accessible by the browser.

In one embodiment, additional information related to the page may be stored with the snapshot. The additional information may be, for example, complexity information corresponding to the page at or near the time the snapshot was taken. The complexity information may be, for example, statistics corresponding to a render tree or a Document Object Model (DOM) tree, or a number of images, or other information.

The user may navigate to one or more pages after leaving the page. In one embodiment, each time a user navigates away from a page a snapshot is stored for that page. These snapshots are used when the user navigates back to the page, as describe in greater detail below.

When the user navigates back to the page, the user will provide a command to the browser, 330. This command may be any of the types of commands described herein. Further, the page may be accessed using a "forward" command or an embedded link, or any other mechanism of providing navigational commands.

In response to a command returning to the previously visited page, the browser retrieves the snapshot corresponding to the page and displays the snapshot in the browser, 340. The snapshot is displayed while the browser loads the page to be displayed, 350. As the page is loaded one or more characteristics corresponding to the page may be monitored, 350.

Various characteristics may be monitored. One or more of them may be utilized. In one embodiment, a complexity measurement may be utilized. In one embodiment, the complexity may be determined by the browser engine. In alternate embodiments, complexity may be determined by other components.

Complexity may be determined, for example, by the size of a render tree for the page, or by the size or number of levels in a Document Object Model (DOM) tree for the page, or by a size allocation corresponding to the page. As the page loads, the complexity may change. In one embodiment, a starting complexity value is maintained and subsequent complexity values are compared to the starting value to determine how complexity has changed. In one embodiment, when complexity has decreased to 50% of the original value, the loading page may be displayed.

In one embodiment, a render tree is analyzed to determine the complexity of the page being loaded. The render tree is very similar to the DOM tree in that it is a tree of objects, where each object can correspond to the document, elements or text nodes. The render tree can also contain additional objects that have no corresponding DOM node. These objects are "renderers" that contain specialized information on how to properly layout specific portions of the document. The render tree may provide a better result because it may more closely represent what a user actually sees on the screen at a given point in time.

Other characteristics may also be utilized. For example, an estimate of a loading time may be made based on the content of the page, a number of outstanding network requests may be monitored, the amount of memory consumed may be monitored, and/or the number of images or image pixels may be monitored.

In one embodiment, a pre-selected period of time (e.g., 100 ms, 250 ms, 75 ms, 300 ms) after a page load is complete, the snapshot may be replaced by the loaded page. Some pages continue to provide new content after indicating that the page load is complete. In one embodiment, a variable time period may be utilized. The time period may be selected based on, for example, the size of the page, known conditions related to the page, the source of the page or some of the content, the amount of time required to load the page, etc.

When the monitored characteristics satisfy pre-selected conditions, the page may be displayed instead of the snapshot, 360. In one embodiment, an animated transition between the snapshot and the page may be provided. The pre-selected condition may be, for example, a specified decrease in complexity, a specified increase in complexity, or loading of a specified percentage of images, loading of a specified percentage of content, etc. In one embodiment, a pre-selected condition may be comparing a ratio of subsequent complexity to an original complexity, and when the ratio reaches a threshold the page is displayed.

In one embodiment, one of the pre-selected conditions may be that there are no outstanding network requests, or a period of time after there are no outstanding network requests. Combinations of one or more of these pre-selected conditions may also be used. For example, the page may be displayed rather than the snapshot when either a complexity criteria or no outstanding network requests criteria are met. Other combinations may also be supported.

Figure 4:
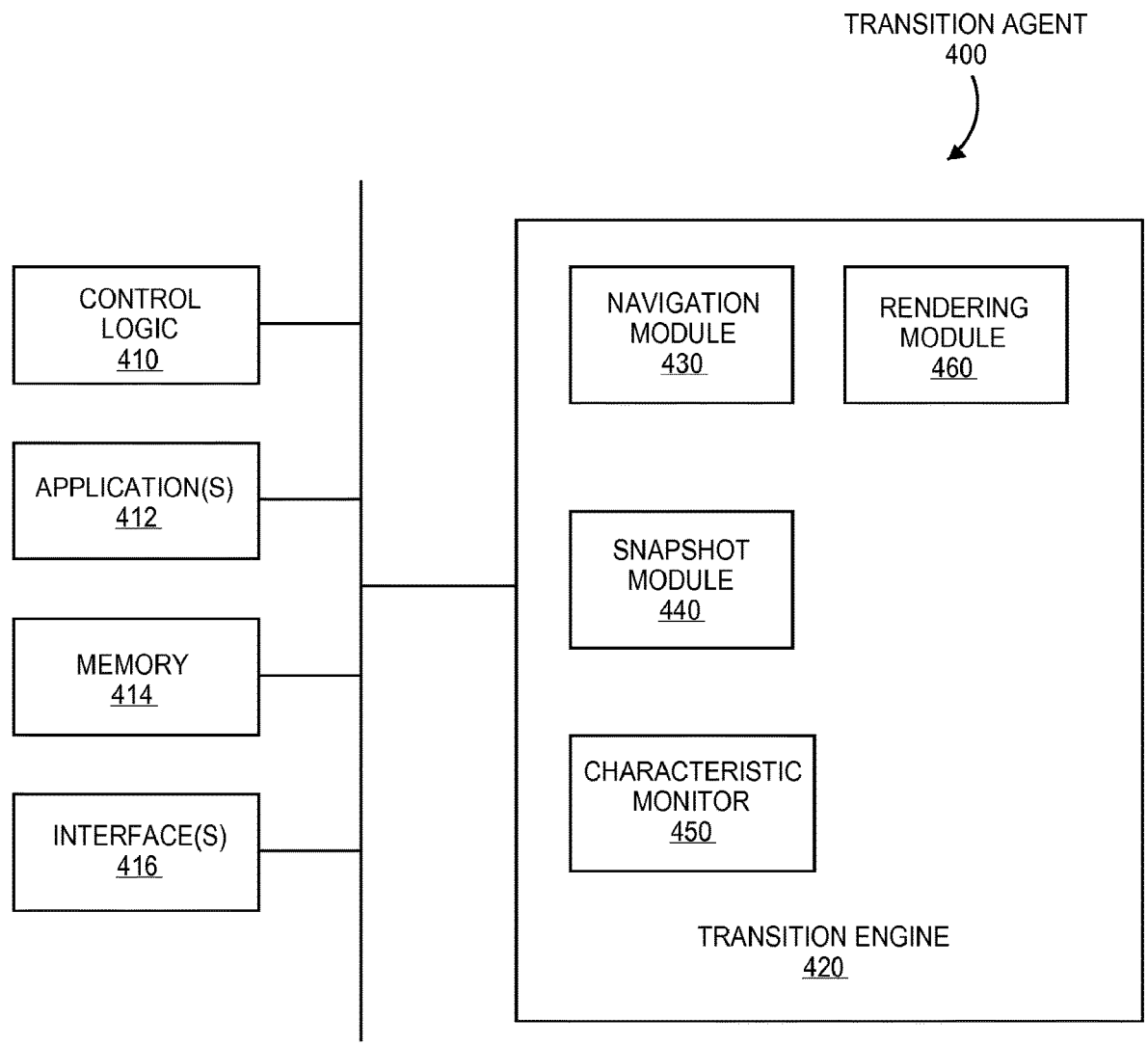
FIG. 4 is a block diagram of one embodiment of a transition agent.

FIG. 4 is a block diagram of one embodiment of a transition agent that may be resident within, for example, a browser application, an electronic system providing a browser application, or a combination thereof. Transition agent 400 includes control logic 410, which implements logical functional control to direct operation of transition agent 400, and/or hardware associated with directing operation of transition agent 400. Logic may be hardware logic circuits and/or software routines. In one embodiment, transition agent 400 includes one or more applications 412, which represent code sequence and/or programs that provide instructions to control logic 410.

Transition agent 400 includes memory 414, which represents a memory device and/or access to a memory resource for storing data and/or instructions. Memory 414 may include memory local to transition agent 400, as well as, or alternatively, including memory of the host system on which transition agent 400 resides. Transition agent 400 also includes one or more interfaces 416, which represent access interfaces to/from (e.g., an input/output interface, application programming interface) transition agent 400 with regard to entities (electronic or human) external to transition agent 400.

Transition agent 400 also includes transition engine 420, which represents one or more functions that enable transition agent 400 to provide the transitioning between pages as described herein. Example modules that may be included in transition engine 420 are navigation module 430, snapshot module 440, characteristic monitor 450 and rendering module 460. Each of these modules may further include other modules to provide other functions. As used herein, a module refers to routine, a subsystem, etc., whether implemented in hardware, software, firmware or some combination thereof.

Navigation module 430 operates to detect navigation events. Navigation module 430 may be configured to detect navigation inputs from various user interfaces including, for example, a touch screen, a control pad, a cursor control device, a keyboard, etc. Navigation module 430 may operate to initiate the transition mechanisms described herein in response to detecting a navigation event that causes the browser to return to a previously viewed page.

Snapshot module 440 operates to manage snapshots that may be utilized as described herein. Snapshot module 440 may cause snapshots to be taken in response to navigation away from a page and to retrieve snapshots for previously viewed pages. Snapshot module 440 may also manage memory locations used for storing the snapshots as well as managing other information (e.g., complexity information, image information) for snapshots.

Characteristic monitor 450 may operate to monitor and/or track characteristics of interest for the page being loaded. These characteristics include, for example, complexity, memory usage, memory requirements, image information, network access requests, etc. In one embodiment, characteristic monitor 450 periodically, or continually, monitors these characteristics as the page is loaded. In one embodiment, characteristic monitor 450 may generate a signal when the monitored characteristics cross a pre-selected threshold. This signal may be utilized to cause the snapshot to be replaced with the page that may be fully or partially loaded.

Rendering module 460 operates to render images to be displayed by the browser. Rendering module 460 may be used to generate images representing the page, to generate the snapshot, and/or to blend the page and the snapshot. Rendering module 460 may use any rendering techniques known in the art.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:
   receiving a first command to cause a web browser application to navigate away from a page displayed within the web browser application, wherein the first command is an input corresponding to a forward command within the web browser application, a back command within the web browser application, or selection of a link within the page displayed within the web browser application;
   storing a snapshot of the page in response to receiving the first command to navigate away from the page, the snapshot including an image of the displayed page and one or more characteristics determined while loading the page;
   receiving a second command to cause the web browser application to navigate back to the page;
   displaying the snapshot within the web browser application in response to receiving the second command to navigate back to the page;
   loading a current version of the page while displaying the snapshot;
   determining when to replace the snapshot with the current version of the page, based upon the one or more characteristics stored with the snapshot of the page, the one or more characteristics including a change in page complexity, the page complexity determined by a page render tree size; and
   replacing the snapshot with the current version of the page.

2. The method of claim 1, wherein the one or more characteristics stored with the snapshot and used to determine when to replace the snapshot with the current version of the page are obtained by monitoring the one or more characteristics during loading of the page, and the one or more characteristics include a size or number of levels of a Document Object Model (DOM) tree generated for the page.

3. The method of claim 1, wherein determining when to replace the snapshot with a current version of the page in response to loading of the current version of the page comprises:
   determining an original page complexity from the one or more characteristics stored with the snapshot;
   determining a subsequent page complexity, by monitoring corresponding one or more characteristics of loading the current version of the page;
   comparing the original page complexity to the subsequent page complexity; and
   replacing the snapshot with the current version of the page if the subsequent page complexity exceeds a specified amount of the original complexity.

4. The method of claim 3, wherein the specified amount is 50%.

5. The method of claim 3, wherein determining the original page complexity comprises determining an original render tree size, and wherein determining the subsequent page complexity comprises determining a subsequent render tree size of the current version of the page being loaded.

6. The method of claim 3, wherein determining the original page complexity comprises determining an original DOM tree size, and wherein determining the subsequent page complexity comprises determining a subsequent DOM tree size of the current version of the page being loaded.

7. The method of claim 1, wherein a snapshot is automatically stored for a page, including one or more characteristics associated with loading the page, each time a command is received to navigate away from the page.

8. The method of claim 1, wherein navigation back to the page occurs in response to a swipe motion by a user on a touch interface.

9. The method of claim 8, wherein the touch interface comprises a touch screen.

10. The method of claim 8, wherein the touch interface comprises a touch pad.

11. The method of claim 1, wherein the current version of the page comprises a fully-loaded current version of the page.

12. The method of claim 1, wherein the current version of the page comprises a partially-loaded current version of the page.

13. A non-transitory computer-readable medium having stored thereon instructions that, when executed, cause one or more processors to:
- receive a first command to cause a web browser application to navigate away from a page displayed within the web browser application, wherein the first command is an input corresponding to a forward command within the web browser application, a back command within the web browser application, or selection of a link within the page displayed within the web browser application;
- store a snapshot of the page in response to receiving the first command to navigate away from the page, the snapshot including an image of the displayed page and one or more characteristics associated with loading the page;
- receive a second command to cause the web browser application to navigate back to the page;
- display the snapshot within the web browser application in response to receiving the second command to navigate back to the page while a current version of the page is being loaded;
- determine when to replace the snapshot with the current version of the page, based upon the one or more characteristics stored with the snapshot of the page, the one or more characteristics including a change in page complexity, the page complexity determined by a page render tree size; and
- replace the snapshot with the current version of the page.

14. The computer-readable medium of claim 13, wherein the one or more characteristics stored with the snapshot and used to determine when to replace the snapshot with the current version of the page are obtained by monitoring the one or more characteristics during loading of the page, and the one or more characteristics include a size or number of levels of a Document Object Model (DOM) tree generated for the page.

15. The computer-readable medium of claim 13, wherein the instructions that cause the one or more processors to determine when to replace the snapshot with a current version of the page in response to loading of the current version of the page comprise instructions that, when executed, cause the one or more processors to:
- determine an original page complexity from the one or more characteristics stored with the snapshot;
- determine a subsequent page complexity, by monitoring corresponding one or more characteristics of loading the current version of the page;
- compare the original page complexity to the subsequent page complexity; and
- replace the snapshot with the current version of the page if the subsequent page complexity exceeds a specified amount of the original complexity.

16. The computer-readable medium of claim 15, wherein the specified amount is 50%.

17. The computer-readable medium of claim 15, wherein determining the original page complexity comprises determining an original render tree size, and wherein determining the subsequent page complexity comprises determining a subsequent render tree size of the current version of the page being loaded.

18. The computer-readable medium of claim 15, wherein determining the original page complexity comprises determining an original DOM tree size, and wherein determining the subsequent page complexity comprises determining a subsequent DOM tree size of the current version of the page being loaded.

19. The computer-readable medium of claim 13, wherein a snapshot of the page is automatically stored, including one or more characteristics of the loading of the page, each time a command is received to navigate away from the page.

20. The computer-readable medium of claim 13, wherein navigation back to the page occurs in response to a swipe motion by a user on a touch interface.

21. The computer-readable medium of claim 20, wherein the touch interface comprises a touch screen.

22. The computer-readable medium of claim 20, wherein the touch interface comprises a touch pad.

23. The computer-readable medium of claim 13, wherein the current version of the page comprises a fully-loaded current version of the page.

24. The computer-readable medium of claim 13, wherein the current version of the page comprises a partially-loaded current version of the page.

25. An apparatus having memory and one or more processors, the memory storing instructions that configure the one or more processors to:
- receive a first command to cause a web browser application to navigate away from a page displayed within the web browser application, wherein the first command is an input corresponding to a forward command within the web browser application, a back command within the web browser application, or selection of a link within the page displayed within the web browser application;
- store a snapshot of the page in response to receiving the first command to navigate away from the page, the snapshot including an image of the displayed page and one or more characteristics associated with loading the page;
- receive a second command to cause the web browser application to navigate back to the page;
- display the snapshot within the web browser application in response to receiving the second command to navigate back to the page;
- load a current version of the page while displaying the snapshot;
- determine when to replace the snapshot with the current version of the page, based upon the one or more characteristics stored with the snapshot of the page and one or more characteristics of the current version of the page, including a change in page complexity, the page complexity determined by a page render tree size; and
- replace the snapshot with the current version of the page.

26. The apparatus of claim 25, wherein determining when to transition from the snapshot to the current version of the page is determined from the one or more characteristics stored with the snapshot based on an estimated loading time of content of the page, or an amount of memory consumed in rendering the page from which the snapshot was taken.

27. The apparatus of claim 25, wherein the one or more characteristics stored with the snapshot and used to determine when to replace the snapshot with the current version of the page are obtained by monitoring the one or more characteristics during loading of the page, and the one or more characteristics include a size or number of levels of a Documents Object Model (DOM) tree generated during loading of the page.

28. The apparatus of claim 25, wherein the one or more processors are further configured to:
- determine an original page complexity from the one or more characteristics stored with the snapshot, determine a subsequent page complexity, by monitoring corresponding one or more characteristics of loading the current version of the page, compare the original page complexity to the subsequent page complexity, and replace the snapshot with the current version of the page if the subsequent page complexity exceeds a specified amount of the original complexity.

29. The apparatus of claim 28, wherein the specified amount is 50%.

30. The apparatus of claim 28, wherein the one or more processors are further configured to determine an original render tree size and determine a subsequent render tree size of the current version of the page being loaded.

31. The apparatus of claim 28, wherein the one or more processors are further configured to determine an original DOM tree size, and wherein determining the subsequent page complexity comprises determining a subsequent DOM tree size of the current version of the page being loaded.

32. The apparatus of claim 25, wherein a snapshot of a page is automatically stored, including one or more characteristics obtained by monitoring loading of the page, each time a command is received to navigate away from the page.

33. The apparatus of claim 25, wherein navigation back to the page occurs in response to a swipe motion by a user on a touch interface.

34. The apparatus of claim 33, wherein the touch interface comprises a touch screen.

35. The apparatus of claim 33, wherein the touch interface comprises a touch pad.

36. The apparatus of claim 25, wherein the current version of the page comprises a fully-loaded current version of the page.

37. The apparatus of claim 25, wherein the current version of the page comprises a partially-loaded current version of the page.

38. A non-transitory computer-readable medium having stored thereon instructions that, when executed, cause one or more processors to:

monitor, by an application, one or more characteristics associated with loading a page, including attributes of a DOM tree generated while loading the page;

receive a first command to cause a web browser application to navigate away from the page displayed within the web browser application, automatically store a snapshot of the page in response to receiving the first command to navigate away from the page, the snapshot including an image of the page displayed within the web browser application and the one or more characteristics associated with loading the page;

receive a second command to cause the web browser application to navigate back to the page;

display the snapshot within the web browser application in response to receiving the second command to navigate back to the page, the snapshot displayed in place of a current version of the page while loading a current version of the page, monitor corresponding one or more characteristics associated with loading the current version of the page;

replace the snapshot with the current version of the page in response to an amount of change between the one or more characteristics stored with the snapshot and the corresponding one or more characteristics associated with the loading of the current version of the page meeting, wherein the one or more characteristics include a page complexity, the page complexity determined by a page render tree size; and automatically generating and storing a snapshot for a rendered version of the page in response to each subsequent command to navigate away from the rendered version of the page.

39. The non-transitory computer-readable medium of claim 38, wherein the one or more characteristics stored with the snapshot and used to determine when to replace the snapshot with the current version of the page are obtained by monitoring the one or more characteristics during loading of the page, and the one or more characteristics include a size or number of levels of a Document Object Model (DOM) tree generated for the page.

40. The non-transitory computer-readable medium of claim 39, wherein the instructions that cause the one or more processors to replace the snapshot with a current version of the page in response to loading of the current version of the page meeting one or more criteria comprise instructions that, when executed, cause the one or more processors to:

determine an original page complexity;

determine a subsequent page complexity;

compare the original page complexity to the subsequent page complexity; and replace the snapshot with the current version of the page if the subsequent page complexity exceeds a specified amount of the original complexity.

* * * * *